US012811409B2

(12) United States Patent
Pinto et al.

(10) Patent No.: US 12,811,409 B2
(45) Date of Patent: Nov. 24, 2026

(54) BATTERY HEATING USING PLUG-IN BATTERY CHARGER

(71) Applicant: GM GLOBAL TECHNOLOGY OPERATIONS LLC, Detroit, MI (US)

(72) Inventors: Nicholas W. Pinto, Shelby Township, MI (US); Shuonan Xu, Troy, MI (US); Neeraj S. Shidore, Novi, MI (US); Lei Hao, Troy, MI (US); Chandra S. Namuduri, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 628 days.

(21) Appl. No.: 18/488,309

(22) Filed: Oct. 17, 2023

(65) Prior Publication Data

US 2025/0125647 A1 Apr. 17, 2025

(51) Int. Cl.

| | |
|---|---|
| ***H02J 7/06*** | (2006.01) |
| ***H01M 10/44*** | (2006.01) |
| ***H01M 10/48*** | (2006.01) |
| ***H01M 10/615*** | (2014.01) |
| ***H01M 10/635*** | (2014.01) |
| ***H01M 10/637*** | (2014.01) |
| ***H01M 10/6571*** | (2014.01) |
| ***H02J 7/80*** | (2026.01) |
| ***H02J 7/90*** | (2026.01) |

(52) U.S. Cl.

CPC ............ *H02J 7/06* (2013.01); *H01M 10/446* (2013.01); *H01M 10/486* (2013.01); *H01M 10/615* (2015.04); *H01M 10/635* (2015.04); *H01M 10/637* (2015.04); *H01M 10/6571* (2015.04); *H02J 7/80* (2026.01); *H02J 7/927* (2026.01); *H02J 7/933* (2026.01)

(58) Field of Classification Search

CPC ............ H01M 10/446; H01M 10/486; H01M 10/615; H01M 10/635; H01M 10/637; H01M 10/6571; H02J 7/80; H02J 7/927; H02J 7/933

See application file for complete search history.

(56) References Cited

U.S. PATENT DOCUMENTS

| | | | | |
|---|---|---|---|---|
| 2014/0285155 A1* | 9/2014 | Choi | H02J 7/02 | 320/134 |
| 2023/0231218 A1* | 7/2023 | Li | H01M 10/633 | 429/62 |
| 2026/0149076 A1* | 5/2026 | Moon | H01M 10/48 | |

* cited by examiner

*Primary Examiner* — Laura A Gudorf

(74) *Attorney, Agent, or Firm* — Dority & Manning, P.A.

(57) ABSTRACT

An electrical system includes a battery, temperature sensor, and battery charging station connectable to the battery and to an alternating current (AC) power supply. The charging station includes connected battery charging and heating circuits. The charging circuit includes a first plurality of power switches configured to rectify an AC input voltage from the power supply into a direct current (DC) voltage for charging the battery during a battery charging mode. The heating circuit includes a voltage bus, transformer, series switch, and a second plurality of power switches downstream of the transformer. The heating circuit generates an AC battery current from the DC voltage and injects the same into the battery during a battery heating mode. An electronic controller controls the power switches and the series switch to perform the charging and heating modes, doing so via a corresponding method.

20 Claims, 5 Drawing Sheets

BATTERY HEATING USING PLUG-IN BATTERY CHARGER

INTRODUCTION

The present disclosure relates to systems and related control methodologies for heating a battery in coordination with a battery charging operation.

Battery-powered electric motors are energized by a controlled discharge of an electrochemical battery. Under cold ambient conditions, the life and health of the battery may be optimized by heating the battery to a threshold temperature before initiating charging operations. Onboard a motor vehicle having an electrified powertrain system, the process of heating a high-voltage propulsion battery pack is often performed automatically, e.g., via an external heating blanket or circulation of an electrical coolant by a thermal management system. However, smaller battery-powered motorized systems such as power tools and golf carts tend to lack such heating devices.

SUMMARY

Disclosed herein are electrical circuit topologies and related control methodologies for heating and charging a battery using plug-in alternating current (AC) power, e.g., a 110-120 volt (V)/60 hertz (Hz) or 230V/50 Hz wall outlet. Among other benefits of the present solutions, the circuits and methods expedite battery heating response times and improve uniformity of heat distribution.

In an exemplary implementation, a battery charging station is equipped with or connectable to a battery charging circuit. Additionally, resident circuitry is configured to selectively output an AC current waveform for heating the battery, either directly as an injected AC battery current or via a resistive element or a heating plate as set forth herein. This action occurs when the battery charging station is connected to the AC power source, with the AC power source exemplified herein as the above-noted wall outlet, and when the battery is connected to the battery charging station.

The battery charging station includes a heating circuit. The heating circuit when constructed as contemplated herein includes two or more switching pairs of power switches, along with a series switch disposed between the switching pairs, e.g., on a positive bus rail of the electrical circuit. When battery heating is required, an electronic control unit ("electronic controller") commands the series switch to open. The power switches of the battery heating circuit then conduct an AC current to the battery for the purpose of heating it. In other embodiments, the above-noted heating element resides in or in proximity to the battery, and could be selectively energized using entry condition logic. This action may be performed in conjunction with or as an alternative to the aforementioned AC heating.

In a particular embodiment, an electrical system in accordance with the disclosure includes a temperature sensor configured to measure a temperature of the electrical system as a temperature value, and a battery charging station connectable to a battery and to an AC power supply. The battery charging station in one or more representative embodiments may include a battery charging circuit and a battery heating circuit. The battery charging circuit has a first plurality of power switches configured to rectify an AC input voltage from the AC power supply into a direct current (DC) voltage suitable for charging the battery during a battery charging mode. The battery heating circuit has (i) a voltage bus, (ii) a transformer connectable to the rectifier circuit, (iii) a series switch connected in-line to a voltage rail of the voltage bus downstream of the transformer, and (iv) a second plurality of power switches downstream of the transformer. The battery heating circuit is configured to produce an AC battery current from the DC voltage and selectively inject the AC battery current into the battery during a battery heating mode. This particular AC signal is referenced to the DC voltage level, and thus the positive half cycle drives electrical current into the battery and the negative half cycle pulls current from the battery, thereby generating heat.

An electronic controller in communication with the temperature sensor is configured to control a corresponding state of the power switches and the series switch to perform the battery charging mode in response to a state of charge or voltage level of the battery, and a battery heating mode in response to the temperature value. The electronic controller may perform the battery heating mode concurrently with the battery charging mode in one or more implementations.

The second plurality of power switches may include a first power switching pair separated by a first node, as well as a second power switching pair separated by a second node. The series switch in such an embodiment is connected to the voltage rail between the first and second power switching pairs. The transformer may include a secondary winding connected to the first and second nodes.

In one or more implementations, the temperature sensor is integrated into the battery and configured to measure the temperature value as a measured battery temperature. In other implementations, the temperature sensor is located external to the battery and configured to measure the temperature value as an ambient temperature. The electronic controller is configured to estimate a temperature of the battery using the ambient temperature in the latter embodiment.

The electronic controller may be programmed to estimate the temperature of the battery using the ambient temperature by determining a battery voltage of the battery, temporarily pulsing the battery with an AC battery current, and calculating an internal resistance of the battery using the battery voltage and the AC battery current. The controller may also do so by determining a state of charge (SOC) of the battery using the internal resistance and thereafter estimating the temperature of the battery using the SOC.

The electronic controller in a possible construction is configured to perform the battery heating mode when the temperature value is less than a predetermined minimum charging temperature of less than about 35 °F.

The battery may optionally include a resistive heating element and/or a heating plate. The electronic controller is operable for performing the battery heating mode, at least in part, using the resistive heating element and/or the heating plate.

A method is also disclosed herein for heating a battery of an electrical system. The method in accordance with a possible implementation includes determining an SOC of the battery, determining a temperature value of the electrical system, and controlling a corresponding state of several components via the battery charging station summarized above, which for its part is connectable to the battery and to an AC power supply. These include a first plurality of power switches of a rectifier circuit, a second plurality of power switches, and a series switch. This enables performance of a battery charging mode in response to the SOC of the battery, and a battery heating mode in response to the temperature value.

The method, which may include performing the battery heating mode concurrently with the battery charging mode, may also include measuring the temperature value, as a measured battery temperature, using a temperature sensor that is integrated into the battery. Alternatively, the method may include measuring the temperature value, as a measured battery temperature, using a temperature sensor that is external to the battery and configured to measure the temperature value as an ambient temperature, and then estimating a temperature of the battery via an electronic controller using the ambient temperature.

Estimating the temperature of the battery may include determining a battery voltage of the battery, pulsing the battery with an AC battery current, calculating an internal resistance of the battery using the battery voltage and the AC battery current, determining an additional SOC of the battery using the internal resistance, and estimating the temperature of the battery using the additional SOC.

Heating of the battery may occur via a resistive heating element and/or a heating plate during the battery heating mode.

Another aspect of the disclosure includes a battery heating circuit for use with a battery charging circuit for a battery. The battery heating circuit may include a voltage bus, a transformer connectable to a rectifier circuit of the battery charging circuit, and a series switch connected in-line to a voltage rail downstream of the transformer. Additionally, the battery heating circuit may include a plurality of power switches downstream of the battery charging circuit, and configured to produce an AC battery current from a DC voltage from the battery charging circuit, and selectively inject the AC battery current into the battery during a battery heating mode. As part of this embodiment, an electronic controller may be configured, in response to a temperature value from a temperature sensor being less than a predetermined charging temperature, to control a corresponding state of the plurality of power switches and the series switches to thereby perform a battery heating mode.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
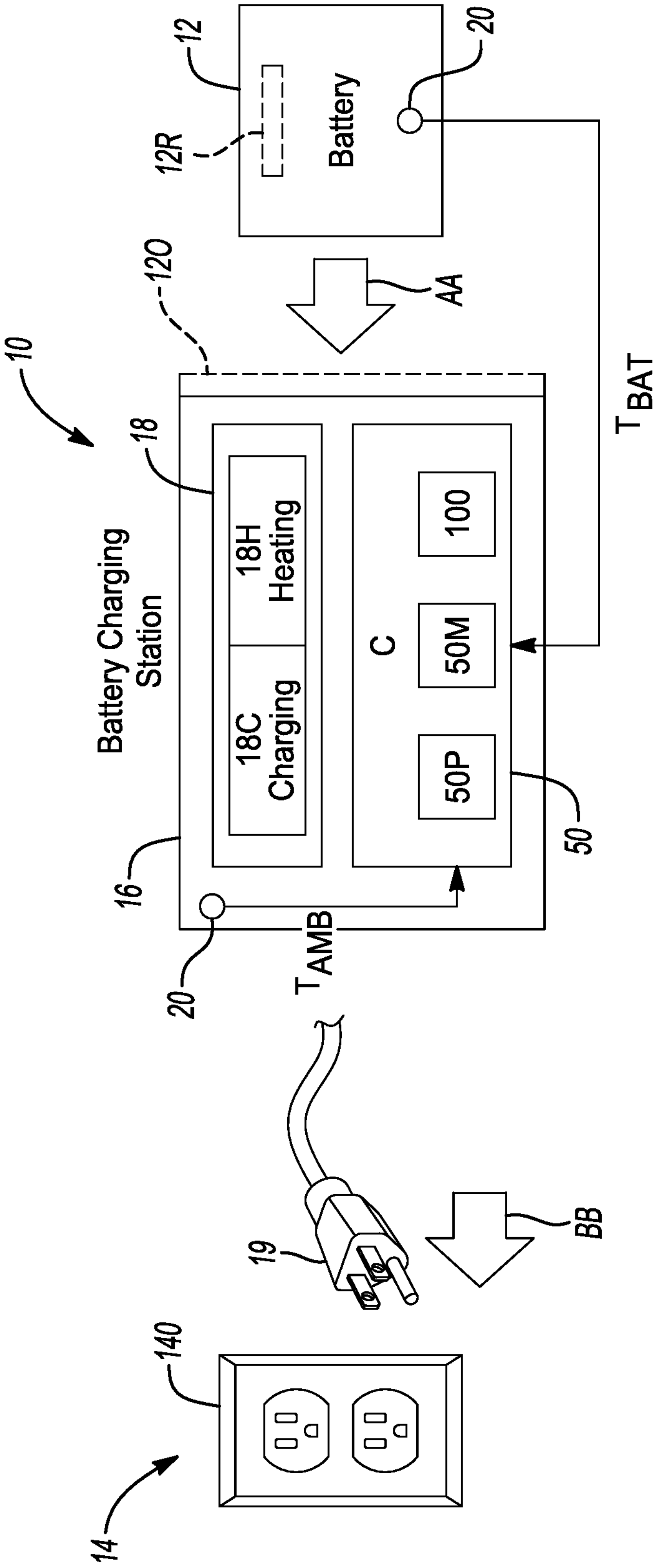
FIG. 1 illustrates a representative electrical system having a battery, an alternating current (AC) power supply, and a battery charger as set forth in detail herein.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring to the drawings, wherein like reference numerals correspond to like or similar components throughout the several Figures, FIG. 1 illustrates an electrical system 10 in which an electrochemical battery 12 is selectively heated and charged via an alternating current (AC) power source 14 using an intervening battery charging station 16. The battery 12 may be a component of the electrical system 10 in some embodiments, or a separately sourced or aftermarket device in others. The battery 12 has an application-suitable chemistry such as but not limited to lithium-ion, lithium-metal, lead acid, or other constructions typically used with power tools, motorized consumer products, golf carts, other motor vehicles, and the like.

In a representative approach, the battery 12 of FIG. 1 is connectable to the battery charging station 16 as indicated by arrow AA, with the battery charging station 16 hereinafter referred to as a battery charger 16 for simplicity. This may occur by placing electrodes (not shown) of the battery 12 in conductive contact with the battery charger 16, via a plug-in connection, etc. The battery charger 16 is then connected to the AC power source 14 as indicated by arrow BB, for instance via an AC cord set 19 when the AC power source 14 is accessed via an AC wall outlet 140 as shown. The particular voltage level supplied by the AC power source 14 may vary based on charging location, with 110-120 VAC being a representative and non-limiting implementation.

The battery charger 16 for its part includes a dual-function electrical circuit 18. As described below with reference to FIG. 2, the dual-function electrical circuit 18 is arranged in function-specific subcircuits, i.e., a battery charging circuit 18C and a battery heating circuit 18H. Although the dual-function electrical circuit 18 is illustrated as a unitary element within the battery charger 16 for simplicity and in accordance with a particular construction, the battery heating circuit 18H could be separately located in other embodiments. That is, the battery heating circuit 18H may be used in conjunction with an existing battery charger equipped solely with the battery charging circuit 18C, in which case the battery heating circuit 18H would be selectively used as an adapter or another connectable aftermarket module. For illustrative consistency, however, the battery heating circuit 18H will be described hereinafter as an integral component of the battery charger 16.

Still referring to FIG. 1, the battery charger 16 includes an electronic control module or controller (C) 50 that is operable for monitoring performance of the battery 12 and the battery charger 16 during charging and heating of the battery 12. The term "controller" and related terms such as control module, module, control, control unit, processor, and similar terms refer to one or various combinations of one or more processors 50P and application-sufficient memory 50M. The processor(s) 50P may be embodied as, e.g., Application Specific Integrated Circuit(s) (ASIC), Field-Programmable Gate Array (FPGA), electronic circuit(s), central processing unit(s), e.g., microprocessor(s).

Associated non-transitory computer-readable storage component(s) of the memory 50M may include read only memory, programmable read only, random access, magnetic hard drives, optical drives, etc. Non-transitory components of the memory 50M are capable of storing machine-readable instructions in the form of one or more software or firmware programs or routines, including those embodying a method 100 exemplified in FIG. 4, combinational logic circuit(s), input/output circuit(s) and devices, signal conditioning and buffer circuitry and other components that can be accessed by the processor(s) 50P to provide the described functionality.

Although omitted from FIG. 1 for illustrative simplicity, the controller 50 may also include input/output circuit(s) and devices including analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals. Alternatively, routines may be executed in response to occurrence of a triggering event.

When performing the method 100, the controller 50 of FIG. 1 determines temperature information as part of its programmed functionality. The electrical system 10 of FIG. 1 may be equipped with one or more temperature sensors 20, e.g., thermocouples or thermistors, each of which is configured to measure a temperature value. The battery 12 could be equipped with one or more such temperature sensors 20, in which case each temperature sensor 20 measures and reports a measured battery temperature ($T_{BAT}$) to the controller 50. For simplicity, the temperature sensor 20 is described below in the singular without requiring a single temperature sensor 20.

Alternatively, the battery 12 may be characterized by an absence of such temperature sensors 20. When this is the case, the temperature sensor(s) 20 could instead be integrated into the battery charger 16 and configured to measure and report an ambient temperature ($T_{AMB}$) to the controller 50, i.e., a temperature of the surrounding operating environment of the battery 12. Thus, the particular location of measurement of the above-noted temperature value may vary depending on the configuration of the battery 12. As noted below, in some configurations a resistive heating element 12R could be integrated into the battery 12 and/or a heating plate 120 could be provided on which the battery 12 could rest. Thus, AC heating as set forth herein could be used alone or in conjunction with other approaches in different implementations of the present teachings.

Figure 2:
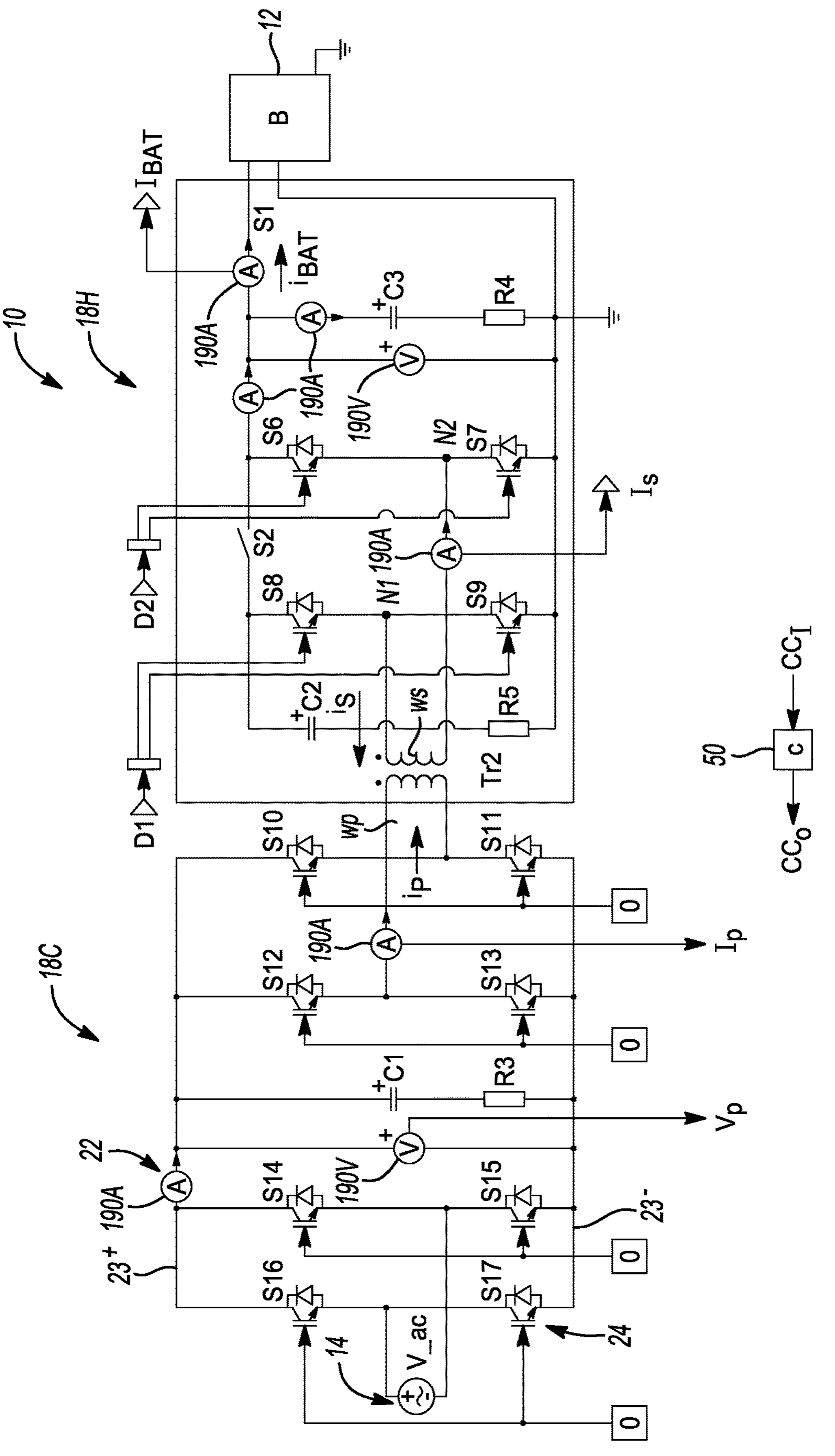
FIG. 2 is a circuit diagram for a representative battery charger in accordance with the disclosure.
Figure 3A:
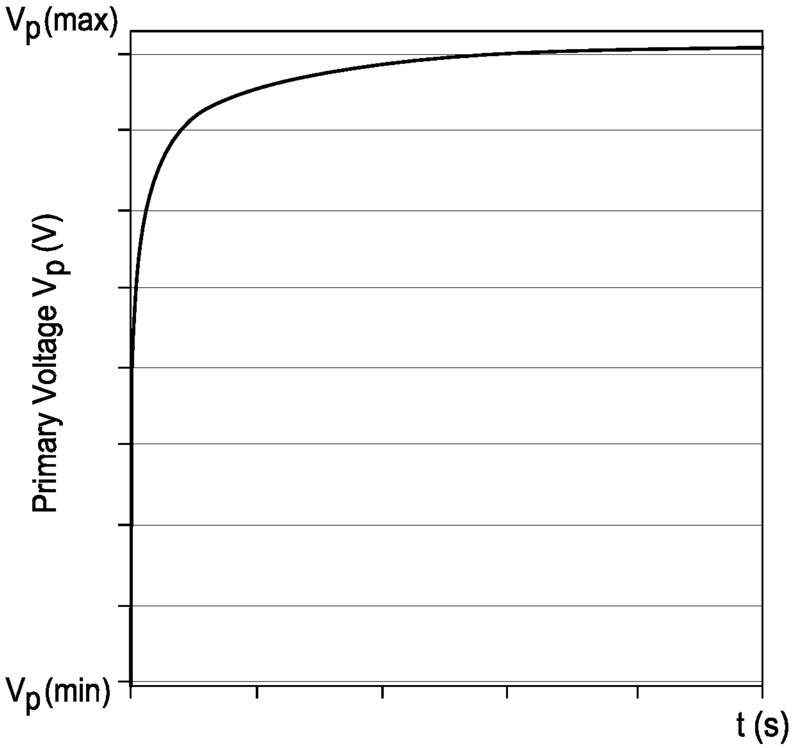
FIGS. 3A, 3B, 3C, and 3D respectively illustrate a representative primary voltage, transformer primary current, transformer secondary current, and an injected AC battery current within the circuit shown in FIG. 2.

Referring now to FIG. 2, the electrical system 10 of FIG. 1 is illustrated in accordance with a possible embodiment. The AC power source 14, shown at far left in FIG. 2 as outputting a voltage V_ac, is connected to the battery charging circuit 18C. In particular, the AC power source 14 is connected to a rectifier circuit 22 having power switches 24 arranged into power switching pairs and connected between positive and negative voltage rails 23$^+$, 23$^-$. The power switches 24 may be variously embodied as IGBTs, MOSFETs, or another suitable semiconductor switch. For clarity, the power switches 24 of the rectifier circuit 22 are labeled S14, S15, S16, and S17 arranged as power switching pairs (S14, S15) and (S16, S17), with another power switching pair (S12, S13) disposed downstream of the switching pair (S14, S15). As shown in FIG. 3A, therefore, a primary voltage ($V_P$) is present across the voltage rails 23$^+$, 23$^-$ immediately downstream of the power switching pair (S14, S15). Voltages including the primary voltage ($V_P$) could be measured and reported via a corresponding voltage sensor 190V. Similarly, the various currents described herein, including the injected battery current ($I_{BAT}$), could be measured and reported via a corresponding current sensor 190A.

A capacitor (C1) and resistor (R3) are likewise arranged between the voltage rails 23$^+$, 23$^-$ downstream of the power switching pair (S14, S15). Within the charging circuit 18C, additional power switches 24 are arranged as additional power switching pairs (S10, S11) and (S12, S13). During a charging mode, during which the charging circuit 18C is used to charge the battery 12, the controller 50 is configured to output a pulse-width modulation (PWM) voltage signal to each of the power switches 24 to ultimately output a direct current (DC) charging waveform to the connected battery (B) 12.

AC HEATING: the battery heating circuit 18H is disposed between the battery charging circuit 18C and the battery 12 in the non-limiting embodiment of FIG. 2. The battery heating circuit 18H for its part includes additional power switches 24 arranged in a power switching pair (S8, S9) separated by a first node (N1) and a power switching pair (S6, S7) separated by a second node (N2). As noted above, the battery charging circuit 18C is configured to rectify an AC input voltage from the AC power supply 14 into a direct current (DC) voltage for charging the battery 12 during the battery charging mode. The battery heating circuit 18H is configured to produce an AC battery current, i.e., $I_{BAT}$, from the DC voltage output by the rectifier circuit 22 and selectively inject the AC battery current ($I_{BAT}$) into the battery 12 during the battery heating mode. This AC signal is referenced to the DC voltage level, and thus the positive half cycle drives electrical current into the battery 12 and the negative half cycle pulls current from the battery 12, thereby generating heat.

In this configuration, the battery heating circuit 18H also has first and second series switches (S1) and (S2). The first series switch (S1) is arranged on the positive voltage rail 23$^+$ downstream of the power switching pair (S6, S7), and acts as a main battery switch to connect/disconnect the battery 12. Accordingly, the first series switch (S1) is commanded to transition to a closed/ON state by the controller 50 when heating of the battery 12 is desired, as well as when charging the battery 12. As appreciated in the art, the first series switch (S1) in such a position could be commanded to an open/OFF state in response to, e.g., electrical fault conditions, or when the battery 12 is not connected to the battery charging station 16.

Figure 3B:
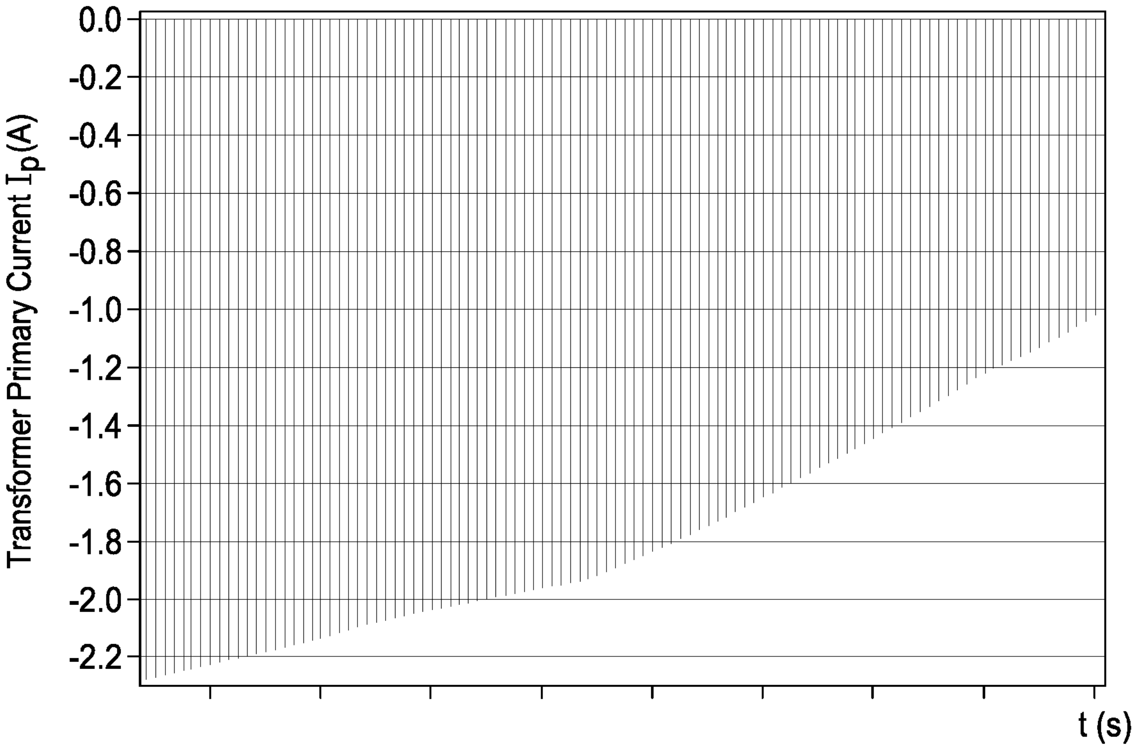
Figure 3C:
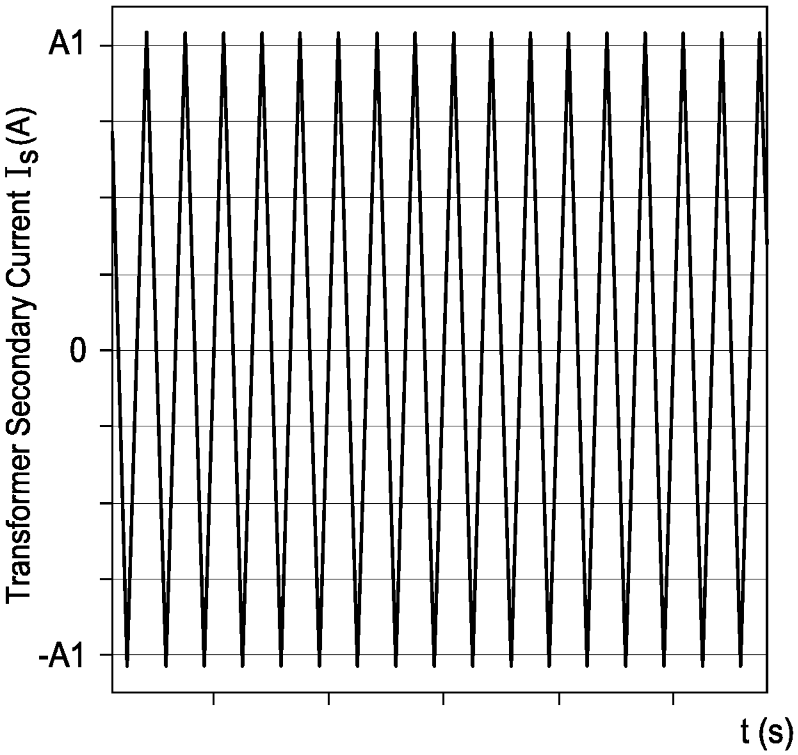

Heating of the battery 12 is possible when the first series switch (S1) is closed, as noted above, when the second series switch (S2) is commanded to an open/OFF state. In this state, as shown in FIG. 3B for a representative 0 to −2.2 amp (A) range, a transformer primary current ($i_P$) is caused to flow into a primary winding (WP) of a transformer Tr2, with the transformer Tr2 illustrated in FIG. 2 as being part of the battery heating circuit 18H. When the battery charging circuit 18C is connected to the AC power source 14, a transformer secondary current ($I_s$) flows through a secondary winding (WS) of the transformer Tr2, with a representative waveform of the transformer secondary current ($I_s$) illustrated in FIG. 3C with the transformer secondary current ($I_S$) ranging from −A1 to A1 on a nominal scale. This transformer secondary current ($I_s$) is fed to additional power switches 24 of the battery heating circuit 18H, i.e., the power switching pairs (S6, S7) and (S8, S9).

Figure 3D:
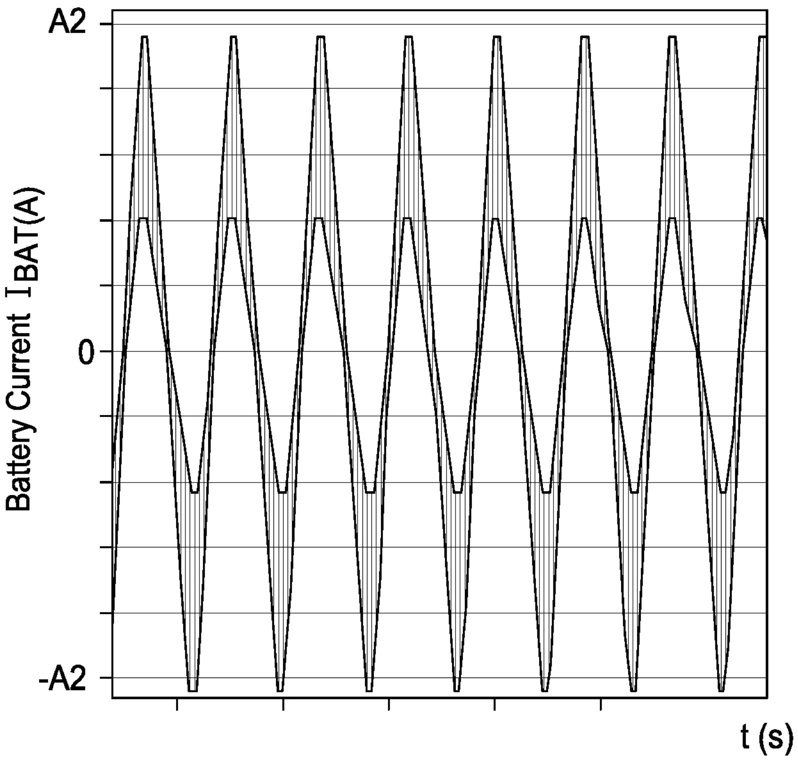

The battery heating circuit 18H of FIG. 2 also includes a capacitor (C2) and resistor (R5) situated between the secondary winding (WS) and the power switching pair (S8, S9) as shown, along with a capacitor (C3) and resistor (R4) located downstream of the power switching pair (S6, S7). By operation of the power switching pairs (S6, S7) and (S8, S9) via corresponding voltage drive signals D1 and D2 transmitted by the controller 50 during performance of the method 100, an AC battery current ($I_{BAT}$) is injected into the battery 12 to heat the battery 12. This AC current injection for the purpose of heating the battery 12 may occur in conjunction with charging of the battery 12 in one or more embodiments, within permitted limits of a manufacturer of the battery 12. An exemplary waveform indicative of the AC battery current ($I_{BAT}$) suitable for heating the battery 12 is illustrated in FIG. 3D, with the AC battery current ($I_{BAT}$) ranging from −A2 to A2 on a nominal scale.

As part of the method 100 described herein, charging of the battery 12 is not permitted by the controller 50 when the battery temperature ($T_{BAT}$) of FIG. 1, whether directly measured or estimated from the ambient temperature ($T_{AMB}$), remains below a specified lower temperature limit suitable for charging, e.g., about −1.1 °C to about 1.67 °C (about 30-35 °F) in a possible implementation. In such an event, the controller 50 could respond to input signals $CC_I$, including the battery temperature ($T_{BAT}$), a state of charge (SOC) and/or voltage of the battery 12, etc., and execute instructions embodying the method 100.

Control commands to the various power switches 24 and the series switches (S1) and (S2) could be implemented via output signals ($CC_O$), including the drive signals D1 and D2, zero-voltage signals (indicated by "0" in FIG. 2), and PWM signals for control of the various power switches 24. This may occur from a computer-readable storage medium of the memory 50M shown in FIG. 1, and causes the controller 50 to initiate AC heating of the battery 12 as described herein. Portions of the associated logic may be used in one or more implementations to determine when to heat the battery 12, possibly using other approaches such as the resistive heating element 12R and/or the heating plate 120 of FIG. 1.

In general, battery heating as considered herein is predicated on determining an amount of the battery current ($I_{BAT}$) that would be sufficient for the intended heating purposes. For instance, a target RMS current could be calculated based on a target temperature rise rate:

$$I^2_{cell,RMS} = \frac{1}{R_{cell}} \cdot \left( \left( \frac{1}{\#\ \text{cells}} \cdot m_{BAT} \cdot C_{p,BAT} \cdot \frac{dT_{cell}}{dt} \right) - hA(T_{cell} - T_{AMB}) \right)$$

where $R_{cell}$ is the cell resistance, $m_{BAT}$ is the battery mass, $C_{p,BAT}$ is the battery capacity, $T_{cell}$ is the cell temperature, and $T_{AMB}$ is the ambient temperature. Thus, the controller 50 is configured to generate a requisite RMS current sufficient for heating up the battery 12 within a designed capacity, e.g., about 1-2 °C/min in a possible approach.

Figure 4:
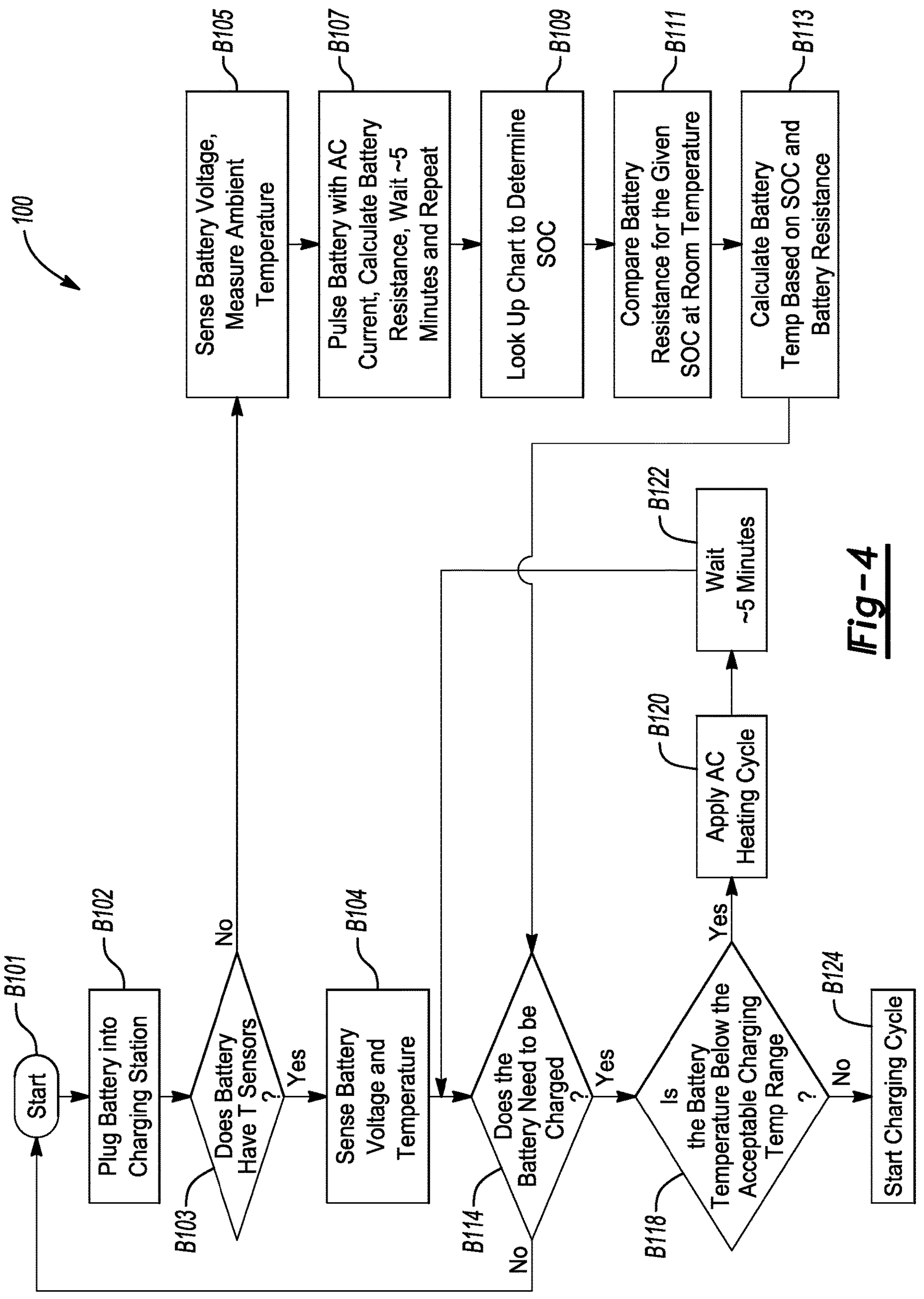
FIG. 4 is a flow chart describing an exemplary embodiment of a method for heating a battery using plug-in AC power via the battery charger of FIGS. 1 and 2.

Referring to FIG. 4, the method 100 in accordance with a possible implementation is described in terms of discrete code segments or logic blocks for illustrative clarity. Instructions embodying each of the logic blocks may be recorded in a computer-readable storage medium, i.e., in non-transitory portions of the memory 50M.

After initiating the method 100 at start block B101, the method 100 commences at block B102 with the controller 50 detecting that the battery 12 has been properly plugged into the battery charger 16, which in turn is electrically connected to the AC power source 14 of FIG. 1. For example, connecting the battery 12 could entail closing a mechanical switch in the battery charger 16, e.g., the first series switch S1, thereby establishing an electrical path between the battery 12 and the AC power source 14. Other approaches to performing block 102 could include detecting a current draw or voltage drop of the battery 12, measuring an impedance across electrode terminals of the battery 12, etc. The method 100 proceeds to block B103 when the controller 50 has ascertained that the battery 12 has been connected to the (energized) battery charger 16.

Block B103 includes determining, via the controller 50, if the battery 12 is equipped with one or more temperature sensors 20 suitable for measuring the battery temperature ($T_{BAT}$) of FIG. 1 directly, i.e., as a measured battery temperature. Block B103 could entail receiving a confirming signal from the temperature sensors 20 indicating their presence, or the controller 50 may be configured for use with a particular make and model of the battery 12 equipped with such temperature sensors 20. The method 100 proceeds to block B104 when the battery 12 is equipped with the temperature sensors 20, and to block B105 in the alternative.

At block B104, the controller 50 of FIG. 1 next senses the battery voltage ($V_{BAT}$) and/or state of charge (SOC) and the battery temperature ($T_{BAT}$). For instance, the controller 50 could measure the battery voltage ($V_{BAT}$) and estimate the SOC based on the measured battery voltage ($V_{BAT}$) and the battery temperature ($T_{BAT}$), e.g., using a lookup table or an SOC model. The method 100 proceeds to block B114 once the battery voltage ($V_{BAT}$), the SOC, and the battery temperature ($T_{BAT}$) have been determined.

At block B105 of FIG. 4, the controller 50 is programmed to estimate the temperature of the battery 12 using the ambient temperature ($T_{AMB}$). In general, the approach of the controller 50 when the battery 12 lacks temperature sensors 20 includes determining the battery voltage ($V_{BAT}$) of the battery 12, temporarily pulsing the battery 12 with an AC current, and calculating an internal resistance ($R_{BAT}$) of the battery 12 using the battery voltage ($V_{BAT}$) and the AC current used during such pulsing. This process also includes determining an SOC of the battery 12 using the internal resistance ($R_{BAT}$), and estimating the temperature of the battery 12 using the SOC.

Therefore, performance of block B105 includes determining the battery voltage ($V_{BAT}$) and/or SOC as in block B104. However, as the battery 12 is not equipped with temperature sensors 20 at this portion of the method 100, the controller 50 instead uses ambient temperature ($T_{AMB}$) from the temperature sensors 20 of the battery charger 16 located on or in remote communication with the controller 50. The method 100 proceeds to block B107 when the controller 50 has ascertained the battery voltage ($V_{BAT}$) and ambient temperature ($T_{AMB}$).

Block B107 includes pulsing the battery 12 with a predetermined AC current waveform, and thereafter calculating an internal battery resistance ($R_{BAT}$) from the battery voltage ($V_{BAT}$) and injected current waveform, i.e., $I_{BAT}$ of FIGS. 2 and 3D. The controller 50 may do this at least twice, waiting a suitable duration between calculations, e.g., about five minutes. The method 100 proceeds to block B109 once the controller 50 has calculated the internal battery resistance ($R_{BAT}$) at least twice.

Block B109 of FIG. 4 includes using a lookup table to determine the SOC of the battery 12. This may occur when the battery resistance values of block B107 are within a calibrated range of one another, i.e., when values of the internal battery resistance ($R_{BAT}$) are sufficiently similar, indicating that the internal resistance is not dynamically changing. Options for when the battery resistance values are changing include, e.g., signaling a possible fault mode or resetting the battery charger 16. The method 100 then proceeds to block B111 when the SOC of the battery 12 has been determined.

Block B111 includes determining a battery resistance value, at room temperature, for the calculated or estimated SOC, e.g., via another lookup table stored in memory 50M in which the internal battery resistance ($R_{BAT}$) at room temperature is predetermined for a range of different SOC values. The method 100 then proceeds to block B113 when the room temperature battery resistance has been ascertained.

At block B113, the controller 50 next calculates the battery temperature based on this additional SOC at room temperature (from block B111), e.g., about 20-22 °C (68-72 °F) and the battery resistance ($R_{BAT}$) noted above. Once again, the controller 50 of FIG. 1 may do so by accessing a lookup table programmed with such information for the particular construction of the battery 12. The method 100 then proceeds to block B114.

Still referring to FIG. 4, at block B114 the controller 50 of FIG. 1 determines whether the battery 12 requires charging. This action is performed using the battery voltage/SOC information from block B104 or B113, depending on whether the battery 12 is equipped with the temperature sensors 20 or not, as set forth above. Block B114 could include comparing the SOC of the battery 12 to a calibrated or user-selected lower SOC limit, e.g., 20-30% of a maximum SOC, and recording a bit flag indicating that charging is required when the SOC is less than the SOC limit. The method 100 may return to block B102 when the battery 12 does not require charging based on this comparison, with the method 100 instead proceeding to block B118 when charging is required.

Block B118 includes determining if the battery temperature ($T_{BAT}$) is less than an acceptable predetermined minimum charging temperature, e.g., about-3.9 °C to 1.7 °C (25 °F-35 °F). The method 100 proceeds to block B120 when the battery temperature ($T_{BAT}$) is less than the predetermined minimum charging temperature, and to block B124 in the alternative ("Start Charging Cycle"), where the charging cycle commences.

Block B120 of FIG. 4 includes applying an AC heating cycle to the battery 12 as noted above in a possible implementation. However, those skilled in the art will appreciate that other forms of heating could be used in block B120 using the same evaluation criteria and decision trees illustrated in FIG. 4. This may include, but is not limited to, energizing the optional resistive heating element 12R of FIG. 1 located within the battery 12, or inductively heating the battery 12 via, e.g., the heating plate 120 within the battery charger 16, or adding such a heating plate 120 in line with the battery charger 16. The method 100 thereafter proceeds to block B122.

At block B122, the controller 50 waits through a predetermined duration, e.g., about five minutes, and then returns to block B114.

As set forth above, the present teachings enable AC heating of batteries 12 of a wide variety of sizes and chemistries typically subject to charging limitations under cold ambient conditions, alone or concurrently with the battery charging mode. Implementation of the method 100 uses the specially-configured battery charger 16 of FIG. 1, which for its part has the requisite circuitry to generate AC pulses in block B120 to achieve fast, uniform heating of the battery 12. Aspects of the disclosure could be implemented as an adapter with the circuit topology of FIG. 2, with such an adapter, e.g., an aftermarket component, being connected between the battery 12 and the battery charger 16. However packaged and configured, the electrical system 10 of FIG. 1 is intended to help extend battery life and facilitate more effective charging. These and other attendant benefits will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An electrical system, comprising:

a temperature sensor configured to measure a temperature of the electrical system as a temperature value; and a battery charging station connectable to a battery and to an alternating current (AC) power supply, the battery charging station including:

a battery charging circuit having a first plurality of power switches configured, as part of a rectifier circuit, to rectify an AC input voltage from the AC power supply into a direct current (DC) voltage for charging the battery during a battery charging mode;

a battery heating circuit having (i) a voltage bus, (ii) a transformer connectable to the rectifier circuit, (iii) a series switch connected in-line to a voltage rail of the voltage bus downstream of the transformer, and (iv) a second plurality of power switches downstream of the transformer, and configured to produce an AC battery current from the DC voltage and selectively inject the AC battery current into the battery during a battery heating mode; and an electronic controller in communication with the temperature sensor, and configured to control a corresponding state of the first plurality of power switches, the second plurality of power switches, and the series switch to perform the battery charging mode in response to a state of charge of the battery, and to perform the battery heating mode in response to the temperature value.

2. The electrical system of claim 1, further comprising: the battery.

3. The electrical system of claim 2, wherein the temperature sensor is integrated into the battery and configured to measure the temperature value as a measured battery temperature.

4. The electrical system of claim 1, wherein the electronic controller is configured to perform the battery heating mode concurrently with the battery charging mode.

5. The electrical system of claim 1, wherein the second plurality of power switches includes:

a first power switching pair separated by a first node; and a second power switching pair separated by a second node, wherein the series switch is connected to the voltage rail between the first power switching pair and the second power switching pair; and the transformer includes a secondary winding connected to the first node and the second node.

6. The electrical system of claim 1, wherein the temperature sensor is external to the battery and configured to measure the temperature value as an ambient temperature, and wherein the electronic controller is configured to estimate a temperature of the battery using the ambient temperature.

7. The electrical system of claim 6, wherein the electronic controller is programmed to estimate the temperature of the battery using the ambient temperature by:

determining a battery voltage of the battery;

temporarily pulsing the battery with an AC current;

calculating an internal resistance of the battery using the battery voltage and the AC current;

determining a state of charge (SOC) of the battery using the internal resistance; and estimating the temperature of the battery using the SOC.

8. The electrical system of claim 1, wherein the electronic controller is configured to perform the battery heating mode when the temperature value is less than a predetermined minimum charging temperature of less than about 35 °F.

9. The electrical system of claim 1, wherein the battery includes a resistive heating element and/or a heating plate, and wherein the electronic controller is operable for performing the battery heating mode, at least in part, using the resistive heating element and/or the heating plate.

10. A method for heating a battery of an electrical system, comprising:

determining a state of charge (SOC) of the battery;

determining a temperature value of the electrical system; and controlling, via a battery charging station connectable to the battery and to an alternating current (AC) power supply, a corresponding state of a first plurality of power switches of a rectifier circuit, a second plurality of power switches, and a series switch to thereby perform a battery charging mode in response to the SOC of the battery, and a battery heating mode in response to the temperature value, wherein the battery charging station includes:

(i) a battery charging circuit having the first plurality of power switches configured to rectify an AC input voltage from the AC power supply into a direct current (DC) voltage for charging the battery during the battery charging mode, and (ii) a battery heating circuit having a voltage bus, a transformer connectable to the rectifier circuit, the series switch connected in-line to a voltage rail of the voltage bus downstream of the transformer, and the second plurality of power switches downstream of the transformer collectively configured to produce an AC battery current from the DC voltage and selectively inject the AC battery current into the battery during the battery heating mode.

11. The method of claim 10, further comprising: performing the battery heating mode concurrently with the battery charging mode.

12. The method of claim 10, further comprising:

measuring the temperature value, as a measured battery temperature, using a temperature sensor that is integrated into the battery.

13. The method of claim 10, further comprising:

measuring the temperature value, as a measured battery temperature, using a temperature sensor that is external to the battery and configured to measure the temperature value as an ambient temperature; and estimating a temperature of the battery via an electronic controller using the ambient temperature.

14. The method of claim 13, wherein estimating the temperature of the battery includes:

determining a battery voltage of the battery;

pulsing the battery with an AC current;

calculating an internal resistance of the battery using the battery voltage and the AC current;

determining an additional SOC of the battery using the internal resistance; and estimating the temperature of the battery using the additional SOC.

15. The method of claim 10, further comprising:

performing the battery heating mode when the temperature value is less than a predetermined minimum charging temperature of about 35 °F.

16. The method of claim 10, further comprising:

heating the battery via a resistive heating element and/or a heating plate during the battery heating mode.

17. A battery heating circuit for use with a battery charging circuit for a battery, the battery heating circuit comprising:

a voltage bus;

a transformer connectable to a rectifier circuit of the battery charging circuit;

a series switch connected in-line to a voltage rail downstream of the transformer;

a plurality of power switches downstream of the battery charging circuit, and configured to produce an AC battery current from a DC voltage from the battery charging circuit, and selectively inject the AC battery current into the battery during a battery heating mode; and an electronic controller configured, in response to a temperature value from a temperature sensor being less than a predetermined charging temperature, to control a corresponding state of the plurality of power switches and the series switch to thereby perform a battery heating mode.

18. The battery heating circuit of claim 17, wherein the plurality of power switches includes:

a first power switching pair separated by a first node; and a second power switching pair separated by a second node, wherein the series switch is connected to the voltage rail between the first power switching pair and the second power switching pair; and the transformer includes a secondary winding connected to the first node and the second node.

19. The battery heating circuit of claim 17, further comprising: the temperature sensor, wherein the temperature sensor is integrated into the battery and configured to measure the temperature value as a measured battery temperature.

20. The battery heating circuit of claim 17, wherein the electronic controller is programmed to estimate the temperature of the battery from an ambient temperature by:

determining a battery voltage of the battery;

pulsing the battery with an AC current;

calculating an internal resistance of the battery using the battery voltage and the AC current;

determining a state of charge (SOC) of the battery using the internal resistance; and estimating the temperature of the battery using the SOC.

* * * * *